(12) United States Patent
Tava

(10) Patent No.: US 8,630,794 B2
(45) Date of Patent: Jan. 14, 2014

(54) METHOD FOR THE OPERATION OF A NAVIGATION DEVICE, AND NAVIGATION DEVICE

(75) Inventor: Marcello Tava, Munich (DE)

(73) Assignee: Bayerische Motoren Werke Aktiengesellchaft, Munich (DE)

( * ) Notice: Subject to any disclaimer, the term of this patent is extended or adjusted under 35 U.S.C. 154(b) by 133 days.

(21) Appl. No.: 13/283,687

(22) Filed: Oct. 28, 2011

(65) Prior Publication Data

US 2012/0109507 A1   May 3, 2012

(30) Foreign Application Priority Data

Oct. 29, 2010 (DE) .......................... 10 2010 050 075

(51) Int. Cl.
 *G06F 19/00* (2011.01)
(52) U.S. Cl.
 USPC ........... 701/400; 701/410; 701/417; 701/423; 701/425; 701/428; 340/988; 340/990; 340/995.1; 340/995.19; 340/995.25; 345/427; 73/170.06
(58) Field of Classification Search
 USPC ......... 701/400, 410, 417, 423, 425, 428, 432, 701/433, 443, 446, 454, 455, 457, 467, 468, 701/469, 495, 532, 533; 340/990, 995.1, 340/995.19, 995.25; 345/427; 73/170.06
 See application file for complete search history.

(56) References Cited

U.S. PATENT DOCUMENTS

| | | | |
|---|---|---|---|
| 5,902,349 A * | 5/1999 | Endo et al. ................... 701/417 |
| 7,260,264 B2 * | 8/2007 | Guillou et al. ................ 382/232 |
| 7,529,415 B2 * | 5/2009 | Lecomte et al. .............. 382/232 |
| 7,630,492 B2 * | 12/2009 | Lecomte et al. ................ 380/33 |
| 7,783,415 B2 * | 8/2010 | Yamane et al. ............... 701/117 |
| 8,094,953 B2 * | 1/2012 | Lecomte et al. .............. 382/232 |
| 8,200,498 B2 * | 6/2012 | LeComte et al. ............. 704/500 |
| 8,306,741 B2 * | 11/2012 | Tu ................................. 701/420 |
| 2006/0116815 A1 * | 6/2006 | Nomura ........................ 701/210 |
| 2009/0248291 A1 | 10/2009 | Poppen |
| 2010/0076773 A1 * | 3/2010 | LeComte et al. ............. 704/500 |
| 2010/0241354 A1 | 9/2010 | Staehlin et al. |
| 2010/0312465 A1 * | 12/2010 | Tu ................................. 701/201 |
| 2011/0112764 A1 * | 5/2011 | Trum ............................ 701/213 |
| 2013/0064274 A1 * | 3/2013 | Tosato .......................... 375/219 |

FOREIGN PATENT DOCUMENTS

| | | |
|---|---|---|
| DE | 10 2008 053 531 A1 | 5/2009 |
| EP | 1 273 883 A1 | 1/2003 |
| EP | 2 270 764 A1 | 1/2011 |

OTHER PUBLICATIONS

German Search Report dated Sep. 12, 2011, including English translation (eight (8) pages).

\* cited by examiner

*Primary Examiner* — McDieunel Marc
(74) *Attorney, Agent, or Firm* — Crowell & Moring LLP

(57) ABSTRACT

A method for the operation of a navigation device, and a corresponding navigation device are provided. Multiple route elements are received which each have at least one parameter. The route elements characterize a route. Each of the route elements are assigned to local route elements which are stored in a digital memory card stored in the navigation device. A quality coefficient for the assignability to a local route element is determined for each of the route elements depending on at least one of the at least one parameters. A route reconstruction quality coefficient is determined depending on the respective quality coefficients of the route elements.

10 Claims, 1 Drawing Sheet

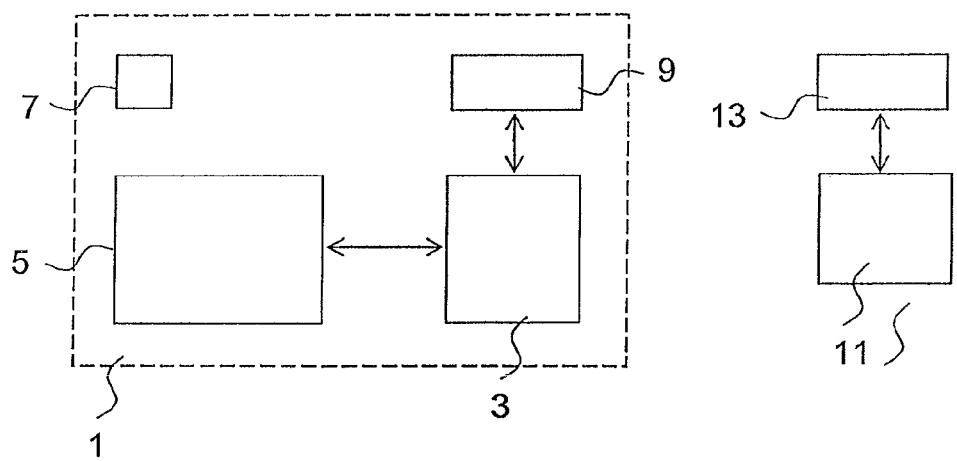

METHOD FOR THE OPERATION OF A NAVIGATION DEVICE, AND NAVIGATION DEVICE

CROSS-REFERENCE TO RELATED APPLICATION

This application claims priority under 35 U.S.C. §119 from German Patent Application No. DE 10 2010 050 075.5, filed Oct. 29, 2010, the entire disclosure of which is herein expressly incorporated by reference.

BACKGROUND AND SUMMARY OF THE INVENTION

The invention relates to a method for the operation of a navigation device, and to a navigation device.

Navigation devices are used in modern motor vehicles with increasing frequency. They enable determination of a route between a starting point and an ending point, and enable regular route guidance to a destination by utilizing updated position data, which is regularly collected by means of a GPS system.

Navigation devices are also equipped with a communication interface with increasing frequency. The interface enables communication with an external computer. In this case, communication takes place via a cellular or wireless radio interface and a corresponding cellular or wireless radio network, wherein the latter can be connected to the Internet. Such a navigation system, which also comprises an external computer in addition to the navigation device and the communication interface which is functionally assigned to the same, makes it possible to transmit a route, represented by route elements, to the navigation device, wherein the route is then utilized for the purpose of route guidance, by way of example. In order to transmit the required information about the route in the most efficient manner possible, data reduction is preferably carried out on multiple route elements which characterize the route in the clearest manner possible.

Each of the route elements can then be utilized in the navigation device to reconstruct the route and then to provide route guidance from the starting point to the prespecified destination.

The problem addressed by the invention is that of creating a method for the operation of a navigation device, and a navigation device, wherein the same enable user-friendly operation of the navigation device.

According to a first aspect of the invention, a method is provided for the operation of a navigation device. According to a second aspect of the invention, a navigation device is provided which is designed for carrying out the method, and optionally also for carrying out an advantageous embodiment of the method.

Multiple route elements, which each comprise at least one parameter, are provided in the navigation device. The route elements characterize a route. By way of example, the route elements can include waypoints. Each of the route elements are functionally assigned to local route elements which are saved on a digital memory is stored in the navigation device. A quality coefficient for the assignability to a local route element is determined for each of the route elements depending on at least one of the at least one parameters. The locally assigned route elements can be utilized to reconstruct the route, which can in turn be used as the basis for route guidance. As such, the route which is characterized by the route elements can fundamentally deviate from the route reconstructed by way of the assigned local route elements.

The reason for this can be the particularly differing degrees to which the digital memory card in the navigation device and the particularly external digital memory card are updated. The external memory card is functionally assigned to the route elements provided in the device. As such, depending on how updated the cards are, for example, different road courses may be present, streets may be added or disappear, or street names may change, for example.

A quality coefficient is determined for each of the route elements for the assignability thereof to a local route element depending on at least one of the at least one parameters. In this way, the quality coefficient is representative of a correlation between each route element and a local route element to which it is assigned.

A quality coefficient for the route reconstruction is determined depending on each of the quality coefficients of the route elements. In this way, information is available which is representative of a correlation between the route and a route which is reconstructed by way of the local route elements. This enables particularly user-friendly operation of the navigation device. By way of example, the route reconstruction quality coefficient can be output in a suitable manner, for example visually and/or acoustically.

In this way, the device can also advantageously output information indicating that the route cannot be reconstructed, if the route reconstruction quality coefficient falls below a prespecified reconstruction threshold. The user can then have the option, for example, of rejecting the route, or using the route for route guidance despite a certain uncertainty in the route guidance.

It is preferred that, if a higher value of the route reconstruction coefficient is representative of a high degree of correlation between the route and the route which is reconstructed by way of the assigned local route elements, the device outputs that the route cannot be reconstructed if the route reconstruction quality coefficient falls below the reconstruction threshold. If, on the other hand, a high value of the route reconstruction quality coefficient is representative of a low degree of correlation between the route and the route which is reconstructed by way of the assigned local route elements, the device outputs that the route cannot be reconstructed if the route reconstruction quality coefficient exceeds the reconstruction threshold.

As such, depending on the form of the data contained in the route reconstruction quality coefficient, the output of the device indicates that the route cannot be reconstructed. In one case this occurs if the coefficient falls below the reconstruction threshold, and in the other case it occurs if the reconstruction threshold is exceeded.

According to a further advantageous embodiment, a parameter quality coefficient is determined for each of the parameters of each of the route elements, and this coefficient characterizes the assignability of each of the parameters to a corresponding parameter of the respective assigned local route element. The quality coefficient for each of the route elements is then determined depending on the parameter quality coefficient.

In this way, the quality coefficient for each of the route elements can be determined in a particularly simple and precise manner.

According to a further advantageous embodiment, the parameter quality coefficients are each weighted with prespecified weighting factors for the purpose of determining the quality coefficient. In this way, the method can incorporate a suitable valuation of the individual parameter quality coefficients in a simple manner when determining the quality coefficient, and thereby determine the quality coefficient in a particularly precise manner.

According to a further advantageous embodiment, for the purpose of determining the route reconstruction quality coefficient, the quality coefficients of the route elements are weighted depending on a distance variable, wherein the distance variable is representative of a distance to the geographically proximate route element. In this way, by means of accordingly specifying the respective distance variable, the influence of quality coefficients on the route reconstruction quality coefficient, in a situation where route elements are located in close proximity to each other, for example, can be kept to a minimum.

This implementation utilizes the knowledge that when route elements are located in close proximity to each other, and a quality coefficient is used which is representative of a low correlation, the influence on the correlation between the reconstructed route and the route is relatively small.

It is also particularly advantageous if the reconstruction threshold can be prespecified by user input. In this manner, the user can control when the device outputs that a route could not be reconstructed.

The parameter is preferably characteristic of a geographical coordinate (geo-coordinate), a street name, a direction of travel, a geodetic height, a type of street, a number of road lanes, an orientation with respect to a prespecified direction on the compass, an allowed or average speed on a road, and/or a structural division of a road.

When multiple parameters are assigned to a route element, the individual parameters are then characteristic of one of each of the listed possible characteristics. As such, each route element can have as the parameter, for example, a first parameter which is characteristic of a geo-coordinate, a second parameter which is characteristic of a street name, and by way of example, a third parameter which is characteristic of geodetic height. Particularly by means of providing multiple parameters, assignment can be made with higher probability to an actually suitable local route element.

Each route element can represent, by way of example, a waypoint or a line connecting two waypoints.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic block diagram showing a navigation system having a navigation device; and FIG. 2 is a functional diagram of a computer unit of the navigation device.

DETAILED DESCRIPTION OF THE DRAWINGS

Indices are represented in the reference numbers in the figures by underlines, wherein the letter or number following in each case represents the respective index.

A navigation system has a navigation device 1 (FIG. 1). The navigation device 1 has a computer unit 3, which preferably has a data and program storage device and a processor. The computer unit 3 is designed to process the programs which are stored in the storage device.

The navigation device 1 also has an output device 5, which can be designed as a visual and/or acoustic output device, by way of example.

Moreover, a localization device 7 is functionally assigned to the navigation device 1 and can have a GPS receiver, for example. In addition, a communication interface 9 is functionally assigned to the navigation device 1. The communication interface 9 can, for example, have a mobile communications interface. However, as an alternative or in addition thereto, the navigation device 1 can also have a wired interface, for example, such as a USB interface, by way of example. The navigation device 1 can also have any other kind of communication interface, such as a Bluetooth interface, by way of example. By way of example, the navigation device 1 may be arranged in a vehicle.

Moreover, the navigation system shown in FIG. 1 has an external computer unit 11, wherein a communication interface 13 is likewise directly or indirectly assigned to the computer unit 11. The communication interface 13 is designed to communicate with the communication interface 9 of the navigation device 1. The external computer unit 11 can be designed, for example, as a so-called back end server, or as a server of a corresponding service provider, for example.

The external computer unit 11 can be designed for the purpose of determining a route, and particularly for abstracting the route by means of multiple route elements RE which characterize the route. In this case, data which is compressed as much as possible can be desirable, for the purpose of efficient transmission of data between the communication interfaces 9 and 13. To achieve data compression, a suitable compression method can particularly be used, wherein by use of said method, for example, a number of the route elements RE, which each have at least one parameter PAR and which characterize the route, is kept as small as possible, and particularly minimized.

These multiple route elements RE, which characterize the route, are transmitted to the navigation device 1, particularly upon a request made by the same.

The navigation device 1 is designed, particularly with its computer unit 3, to assign each of the route elements RE to local route elements LRE, wherein the local route elements LRE are stored on a digital memory card. The digital memory card is stored in the navigation device 1, particularly in the data storage device of the computer unit 3. When each of the local route elements LRE are assigned to the respective route elements RE, the extent of the correlation between each of the parameters PAR of the individual local route elements LRE to each of the parameters of the route elements RE is checked.

In this way, the most suitable candidate among the local route elements LRE is assigned to the respective route element RE. The parameters PAR of the route elements RE and also of the local route elements LRE are characteristic, for example, of a geo-coordinate, a street name, a direction of travel, a geodetic height, a type of street, a number of road lanes, an orientation with respect to a prespecified direction on the compass, an allowed or average speed on a road, and/or a structural division of a road.

The route which is reconstructed by use of the assigned local route elements LRE can be used for the purpose of output via the output device and/or for the purpose of route guidance to an ending point of the reconstructed route.

Moreover, as part of the operation of the navigation device 1 a quality coefficient for the assignability to a local route element LRE is determined by the computer unit 3 for each of the route elements RE, depending on at least one of the at least one parameters PAR. In this case, preferably one parameter quality coefficient PGM is determined for each of the parameters PAR of each of the route elements RE, wherein said parameter quality coefficients PGM are characteristic of the respective assignability of the respective parameter PAR to the corresponding parameter of the assigned local route element LRE.

In addition, the quality coefficient GM for each of the route elements RE is determined depending on the respective parameter quality coefficient PGM. The parameter quality coefficients PGM can each assume a prespecified value range, which can extend from 0 to 1, for example where 0 indicates no agreement and 1 indicates complete agreement.

As such, in the event that the values of the geo-coordinates—for example if the parameter PAR is a geo-coordinate—of the assigned local route elements LRE and the respective route element RE fully agree, the respective parameter quality coefficient PGM can have the value 1.

Preferably, the parameter quality coefficients PGM are weighted with corresponding prespecified weighting factors WF for the purpose of determining the quality coefficient GM. This is shown in an exemplary manner in FIG. 2 with reference to the calculation instruction B1. In this way a relative relevance of the individual parameter quality coefficients PGM with respect to each other can be incorporated into the determination of the quality coefficient GM, by means of the weighting factors WF. As such, the parameter PAR, which is characteristic of a geo-coordinate, for example, can be valued relatively highly compared to that of the street name. In addition, in the navigation device 1, and particularly in the computer unit 3 thereof, a route reconstruction quality coefficient RGM can be determined depending on the respective quality coefficients GM of the route elements RE.

In this case, the individual quality coefficients GM are each preferably weighted with a corresponding distance variable RWF, wherein each distance variable is representative of a distance to the respective geographically proximate route element RE. As such, the route reconstruction quality coefficient RGM is determined by means of the calculation instruction B2, for example.

In FIG. 2, an index I attached to the route element RE represents any of a number Q of route elements RE. The index I attached to the quality coefficient GM represents any of a number Q of quality coefficients GM. A number Q of route elements RE represents the respective route.

A number N represents the number of the respective parameter PAR, and accordingly also the number of the parameter quality coefficient PGM, as well as the number of the corresponding weighting factor WF.

For the purpose of determining the route reconstruction quality coefficient RGM, a number Q of quality coefficients GM, and preferably also a number Q of distance variables RWF, are used.

A number K represents a number of local route elements LRE which are stored in the digital card in the computer unit 3. In general, the number K is substantially larger than the number Q as a result.

The determined route reconstruction quality coefficient RGM can be output, for example by way of the output device 5. The output can be visual and/or acoustic, for example. Moreover, the reconstruction quality coefficient RGM can be output for the user, for example, and the user can be requested to decide whether he wants to continue to use the route reconstructed on the basis of the values of the reconstruction quality coefficient RGM—particularly for the purpose of route guidance—or if he wants to discard the route.

Preferably, a reconstruction threshold can also be prespecified, and the output device can signal that the route could not be reconstructed depending on whether the reconstruction quality coefficient RGM falls below the reconstruction threshold.

| Table of Reference Numbers | |
|---|---|
| 1 | Navigation device |
| 3 | Computer unit |
| 5 | Output device |
| 7 | Localization device |
| 9 | Communication interface |
| 11 | External computer unit |
| 13 | Communication interface |
| RE, RE_I | Route element |
| PAR, PAR_1 ... N | Parameter |
| | Route |
| | Digital memory card |
| GM, GM_I | Quality coefficient for assignability |
| LRE, LRE_K | Local route element |
| RGM | Route reconstruction quality coefficient |
| PGM, PGM_1 ... N | Parameter quality coefficient |
| WF, WF_1 ... N | Weighting factor |
| RWF, RWF_I ... Q | Distance variable |
| | Reconstruction threshold |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a navigation device, the method comprising the acts of:
    receiving multiple route elements, each route element having at least one parameter, wherein the route elements characterize a route;
    assigning each of the route elements to local route elements stored in a digital memory card for the navigation device;
    determining, by a processor, a quality coefficient for each of the route elements for assignability thereof to the local route element, depending on at least one of the at least one parameters;
    determining, by the processor, a route reconstruction quality coefficient depending on the respective quality coefficients of the route elements;
    determining parameter quality coefficients for each respective parameter of the route elements, said parameter quality coefficients being characteristic of a respective assignability of each respective parameter to a corresponding parameter of the assigned local route elements; and
    determining the quality coefficient for each respective route element depending on the determined parameter quality coefficient.

2. The method according to claim 1, wherein for determining the quality coefficient, the parameter quality coefficients are weighted with respective prespecified weighting factors.

3. The method according to claim 2, wherein for determining the route reconstruction quality coefficient, the quality coefficients of the route elements are weighted depending on a distance variable representative of a distance to a respective geographically proximate route element.

4. The method according to claim 1, wherein for determining the route reconstruction quality coefficient, the quality coefficients of the route elements are weighted depending on a distance variable representative of a distance to a respective geographically proximate route element.

5. The method according to claim 1, wherein the at least one parameter is characteristic of at least one of a geo-coordinate, a street name, a direction of travel, a geodetic height, a type of street, a number of road lanes, an orientation with respect to a prespecified direction on a compass, an allowed or average speed on a road, and a structural division of a road.

6. A method of operating a navigation device, the method comprising the acts of:
   receiving multiple route elements, each route element having at least one parameter, wherein the route elements characterize a route;
   assigning each of the route elements to local route elements stored in a digital memory card for the navigation device;
   determining, by a processor, a quality coefficient for each of the route elements for assignability thereof to the local route element, depending on at least one of the at least one parameters; and
   determining, by the processor, a route reconstruction quality coefficient depending on the respective quality coefficients of the route elements, wherein the quality coefficients of the route elements are weighted depending on a distance variable representative of a distance to a respective geographically proximate route element.

7. A method of operating a navigation device, the method comprising the acts of:
   receiving multiple route elements, each route element having at least one parameter, wherein the route elements characterize a route;
   assigning each of the route elements to local route elements stored in a digital memory card for the navigation device;
   determining, by a processor, a quality coefficient for each of the route elements for assignability thereof to the local route element, depending on at least one of the at least one parameters;
   determining, by the processor, a route reconstruction quality coefficient depending on the respective quality coefficients of the route elements;
   prespecifying a reconstruction threshold; and
   outputting, by the navigation device, a signal indicating the route could not be reconstructed depending on whether the route reconstruction quality coefficient falls below the prespecified reconstruction threshold.

8. A navigation device, comprising:
   a computer unit having a data and program storage device and a processor;
   an output device operatively coupled with the computer unit; and
   a communication interface operatively coupled with the computer unit;
   wherein the program storage devices comprises program code segments stored therein that:
      determine a quality coefficient for each of multiple route elements received by the navigation device, the quality coefficient being indicative of an assignability of each route element to a local route element stored in the navigation device, wherein the assignability is based on at least one parameter of the route element;
      determine a route reconstruction coefficient depending on the determined respective quality coefficients of the route elements;
      determine parameter quality coefficients for each respective parameter of the route elements, said parameter quality coefficients being characteristic of a respective assignability of each respective parameter to a corresponding parameter of the assigned local route elements; and
      determine the quality coefficient for each respective route element depending on the determined parameter quality coefficient.

9. A navigation device, comprising:
   a computer unit having a data and program storage device and a processor;
   an output device operatively coupled with the computer unit; and
   a communication interface operatively coupled with the computer unit;
   wherein the program storage devices comprises program code segments stored therein that:
      determine a quality coefficient for each of multiple route elements received by the navigation device, the quality coefficient being indicative of an assignability of each route element to a local route element stored in the navigation device, wherein the assignability is based on at least one parameter of the route element; and
      determine a route reconstruction coefficient depending on the determined respective quality coefficients of the route element, wherein the quality coefficients of the route elements are weighted depending on a distance variable representative of a distance to a respective geographically proximate route element.

10. A navigation device, comprising:
   a computer unit having a data and program storage device and a processor;
   an output device operatively coupled with the computer unit; and
   a communication interface operatively coupled with the computer unit;
   wherein the program storage devices comprises program code segments stored therein that:
      determine a quality coefficient for each of multiple route elements received by the navigation device, the quality coefficient being indicative of an assignability of each route element to a local route element stored in the navigation device, wherein the assignability is based on at least one parameter of the route element;
      determine a route reconstruction coefficient depending on the determined respective quality coefficients of the route element,
   prespecify a reconstruction threshold; and
   output a signal indicating the route could not be reconstructed depending on whether the route reconstruction quality coefficient falls below the prespecified reconstruction threshold.

* * * * *